United States Patent [19]
Keeler

[11] Patent Number: 5,136,168
[45] Date of Patent: Aug. 4, 1992

[54] ATOMIC RESONANCE FILTER DETECTOR EMPLOYING INERT BUFFER GAS

[75] Inventor: R. Norris Keeler, McLean, Va.

[73] Assignee: Kaman Aerospace Corporation, Bloomfield, Conn.

[21] Appl. No.: 651,317

[22] Filed: Feb. 6, 1991

Related U.S. Application Data

[63] Continuation-in-part of Ser. No. 446,644, Dec. 6, 1989, abandoned.

[51] Int. Cl.$^5$ .............................................. G02B 5/20
[52] U.S. Cl. ................................. 250/458.1; 359/886
[58] Field of Search ...................... 250/458.1, 361 C; 356/301, 311, 318, 419; 350/312, 1.5; 455/617, 619, 609; 307/425

[56] References Cited

U.S. PATENT DOCUMENTS

| | | | |
|---|---|---|---|
| 4,292,526 | 9/1981 | Marling | 250/458.1 |
| 4,829,597 | 5/1989 | Gelbuachs | 250/458.1 |

Primary Examiner—Carolyn E. Fields
Assistant Examiner—James Beyer
Attorney, Agent, or Firm—Fishman, Dionne & Cantor

[57] ABSTRACT

A method is provided in which the pulse stretching effects of radiation trapping can be minimized in atomic resonance filter detectors or QLORD filter detectors of the type described in U.S. Pat. No. 4,292,526. The QLORD detector of this invention which consists of two spectral bandpass filters, one each located on either side of a transparent cell containing an alkali metal vapor (preferably cesium vapor), and responds to an incoming pulse in the visible part of the spectrum of light (actually 420 to 480 nm), emitting a pulse of infrared light. If the transparent cell contains alkali metal vapor only, the infrared light pulse will be stretched, because of resonant trapping within the alkali metal vapor. However, in accordance with the present invention, an inert buffer gas (namely helium) is added to the alkali metal vapor. This buffer gas allows the rapid leakage of infrared light photons from the wings of the energy spectrum, and hence a more rapid response to the incoming pulse. The present invention is particularly useful in overcoming "false alarms" such as bioluminescence signals when pulse stretching and external noise sources are superimposed, and when a rapid pulse repetition rate is useful.

3 Claims, 4 Drawing Sheets

ATOMIC RESONANCE FILTER DETECTOR EMPLOYING INERT BUFFER GAS

CROSS-REFERENCE TO RELATED APPLICATION this is a continuation-in-part of U.S. application Ser. No. 446,644 filed Dec. 6, 1989, now abandoned.

BACKGROUND OF THE INVENTION

This invention relates generally to optical filters. More particularly, this invention relates to optical filters employing the atomic resonance transitions found in alkali metal vapor atoms wherein inert gases (namely helium) are used as "buffers" to reduce radiation trapping and pulse stretching. The present invention thus minimizes the response time between the excitation of metallic vapor atoms by uv or visible light and the subsequent availability for detection of infrared radiation emitted by the decay of the excited alkali metal vapor atoms.

The quantum limited optical atomic resonance filter detector or QLORD filter detector described in U.S. Pat. No. 4,292,526 (all of the contents of which are incorporated herein by reference) uses atomic resonance transitions to take incoming light at wavelengths in the visible, absorb it, and reemit the light at infrared wavelengths. These atomic resonance filters employ various metal vapors to absorb very narrow band optical radiation in the visible region of the optical spectrum and subsequently emit infrared radiation. Incoming light is transmitted through a high pass filter, and the infrared emitted light is transmitted through a low pass filter. By use of this out of band processing, very low noise levels can be achieved in addition to the intrinsic narrow linewidth of the acceptance frequency, and the $2\pi$ an acceptance angle.

Unfortunately, the quantum limited optical resonance filter detector of U.S. Pat. No. 4,292,526 is associated with excessive pulse stretching (7-8 microseconds in the case of Cesium vapor) caused by radiation trapping within the metal vapor. It will be appreciated that a sharper short emitted pulse is highly preferred over a stretched pulse. This radiation trapping has been analyzed and it has been determined that since a pulse of light travels some 10,000 feet in 10 microseconds, light trapping can seriously limit the performance of the detector for numerous applications.

SUMMARY OF THE INVENTION

The above-discussed and other problems and deficiencies of the prior art are overcome or alleviated by the present invention. In accordance with the present invention, means are provided by which the pulse stretching effects of radiation trapping can be minimized in atomic resonance filter detectors or QLORD filter detectors of the type described in U.S. Pat. No. 4,292,526. The present invention provides such a resonance optical filter detector with a configuration which. reduces the lifetime of resonant trapping to times on the order of 1 microsecond.

The QLORD detector of this invention, which consists of two spectral bandpass filters, one each located on either side of a transparent cell containing an alkali metal vapor (preferably cesium metal vapor), responds to an incoming pulse in the visible part of the spectrum of light (actually 420 to 480 nm), emitting a pulse of infrared light. If the transparent cell contains alkali metal vapor only, the infrared light Pulse will be stretched, because of resonant trapping within the metal vapor. However, in accordance with the present invention, helium gas is added to the alkali metal vapor. This helium acts as inert buffer gas to broaden the wings of the Cesium energy spectrum allowing the rapid leakage of infrared light photons and hence a more rapid response to the incoming pulse.

The present invention is particularly useful in overcoming "false alarms" such as bioluminescence signals when pulse stretching and external noise sources are superimposed, and when a rapid pulse repetition rate is useful.

The present invention is especially useful in submarine laser communications where the transmitters and receivers must be tuned to wavelengths of between 420 to 480 nm.

The above discussed and other features and advantages of the present invention will be appreciated and understood by those of ordinary skill in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1A:
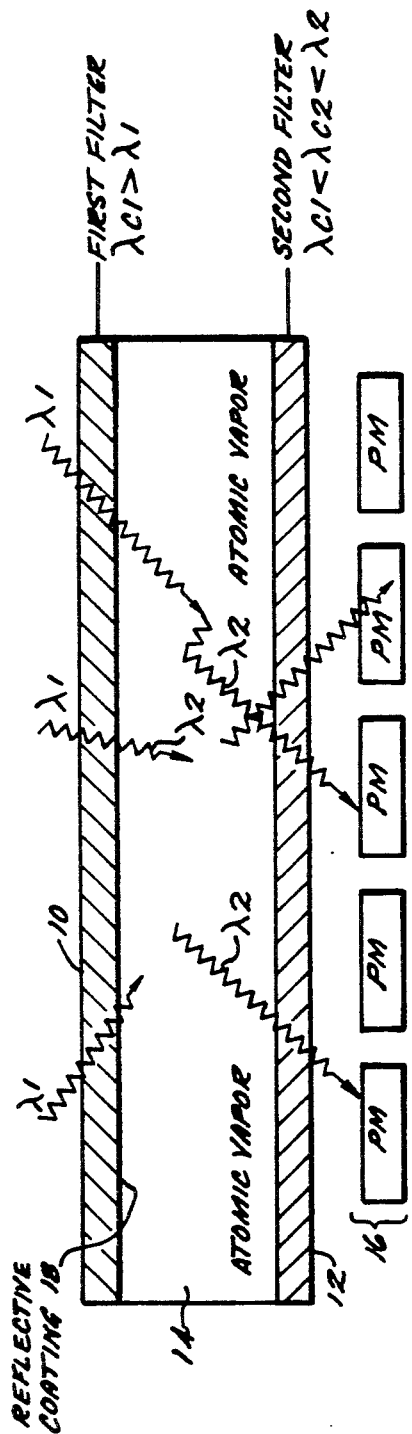
FIGS. 1(A) and 1(B) are schematic side elevation views showing the performance of the filter without (FIG. 1A) buffer gas in accordance with the prior art, and with (FIG. 1B) buffer gas in accordance with the present invention.

Referring to FIG. 1A, a known QLORD passive filter or detector of the type disclosed in U.S. Pat. No. 4,292,526 is shown. This detector comprises a first optical filter 10 spaced apart from a second optical filter 12, thereby forming a cavity 14 for containment of an atomic vapor. The atomic vapor is chosen so that incoming light to be filtered having a frequency $\lambda_1$ raises atoms in the atomic vapor from a ground state to a first excited state, the thus excited atoms eventually fluorescing to the ground state at a wavelength $\lambda_2$ which is longer than that of $\lambda_1$. In this embodiment, the first optical filter 10 is chosen so that it has a cut-off wavelength $\lambda_{c1}$ greater than $\lambda_1$ thereby allowing light of the wavelength $\lambda_1$ to pass therethrough. The atomic vapor contained within the cavity 14 is raised to a first excited state by absorption of a photon at wavelength $\lambda_1$, and then fluoresces at a wavelength $\lambda_2$ which is longer than that of $\lambda_1$. The second optical filter 12 is chosen so that it has a cut-off wavelength $\lambda_{2c}$ less than the fluorescent wavelength $\lambda_2$ but greater than the cut-off wavelength of the first filter $\lambda_{c1}$. Thus, as one can appreciate, if the atomic vapor is chosen so that it will be raised to an appropriate energy level by photons from light having a wavelength to be detected, and from which fluorescence will take place at a wavelength $\lambda_2$ somewhat removed from $\lambda_1$, then a filter as above described will prevent any light entering through the first filter 10 from passing through the second filter 12, and only light generated within the cavity 14 at a wavelength $\lambda_2$ will be able to pass through the second filter 12. A bank of photomultipliers 16 are located directly below the second filter 12, the photomultipliers being chosen to be responsive to the fluorescence wavelength $\lambda_2$. A reflective coating 18 which transmits at wavelength $\lambda_1$, but reflects at wavelength $\lambda_2$ is provided on the side of the first optical filter 10 closest to the cavity 14 in order to prevent absorption of the various light components within the cavity 14.

Doppler broadening in the wavelength shifting of the atomic vapor determines the operating bandwidth of the detector, and is approximately 0.01 Angstroms per hyperfine line component at optical wavelengths. The atomic vapor contained between the two optical filters 10 and 12 is isotropically sensitive to incoming radiation, its effective solid angular sensitivity is limited only by the available fractional transparent surface area of the first filter 10. The time response of the detector is determined by the natural, as well as radiative trapping lifetime of the atomic levels employed in the wavelength shifting, these lifetimes typically being between 0.1 and 10 microseconds. Also as will be understood by those familiar with optical filters, absolute cut off frequencies are rarely obtained. Thus it is assumed that a filter is in a cut off region when more than 85% of incident light is blocked. The atomic vapor preferably comprises a metal vapor and more preferably comprises an alkali metal vapor.

The phenomenon or radiation trapping has been discussed extensively in the literature of astrophysics, particularly as it applies to line radiation transport through stellar atmospheres. If we consider the linewidth of a given transition, there will be a tendency for radiation emitted near the center of the line to be reabsorbed, since the absorption cross section of the given line is highest at the center. If one considers fluorescence taking place at a given time, an indication of the extent of radiation trapping is given by the fluorescent lifetime. For pure doppler broadening (velocity only), the effective fluorescent lifetime under conditions similar to those found in a QLORD detector is around 100 microseconds. As can be seen, this is far too large. If the homogeneous broadening is considered, including natural and resonance broadening, the fluorescent lifetime is reduced to less than 10 microseconds. This is because the radiation released from the wings of the line will not be reabsorbed because of the low absorption on the wings.

Although this is a more desirable situation, the fluorescent lifetime is still too large. While it would be possible, in principle, to further broaden the line by increasing the alkali metal vapor pressure, soon metal dimers would begin to form, ruining the performance of the filter detector. The solution is to increase the pressure by adding the chemically inert rare gases. This causes a lifetime decrease which is a function of $\sqrt{p}$. Using this technique would make the reduction of trapping lifetimes straightforward.

Still referring to FIG. 1A, a large number of high pass photons $\lambda_1$ are shown entering the vapor cell, 14. Essentially all these photons are absorbed in the cell. For every photon absorbed, one is eventually emitted. Some of these photons (e.g. $\lambda_2$) radiate out of the cell while other photons are reabsorbed by metal vapor atoms and subsequently are reemitted. Still other photons undergo multiple absorption and reemission events, i.e. are "trapped", until they finally emerge from the cell.

Figure 1B:
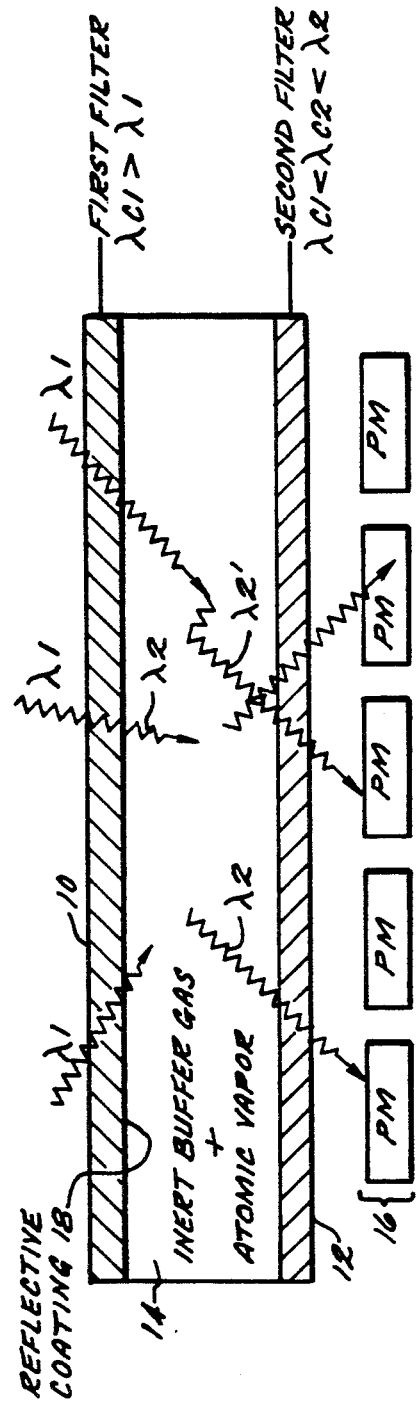

Referring now to FIG. 1B and in accordance with the present invention, an alkali metal vapor (Preferably cesium vapor) is provided to cavity 14 and an inert buffer gas consisting of helium is added to the alkali metal vapor cavity 14. FIG. 1B shows the operation of the optical QLORD filter with a helium inert buffer gas. Photons $\lambda_1$ enter the filter, and are absorbed. Most of the infrared photons $\lambda_2$ are emitted immediately; there is also some trapping and reemission. These few straggling photons $\lambda'_2$ emerge from the cell subsequently. The overall result is a much shortened or sharper pulse compared to the stretched pulse emitted in the filter of FIG. 1A.

Figure 2A:
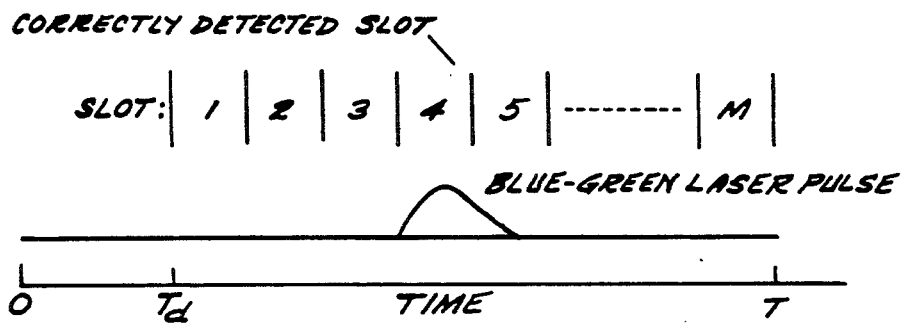
FIGS. 2A-C are graphs showing the effect of bioluminescence on the false alarm rate in optical communications.
Figure 2B:
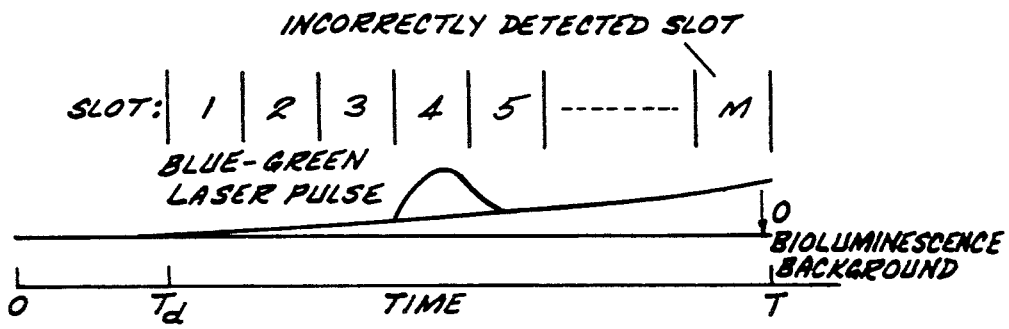
Figure 2C:
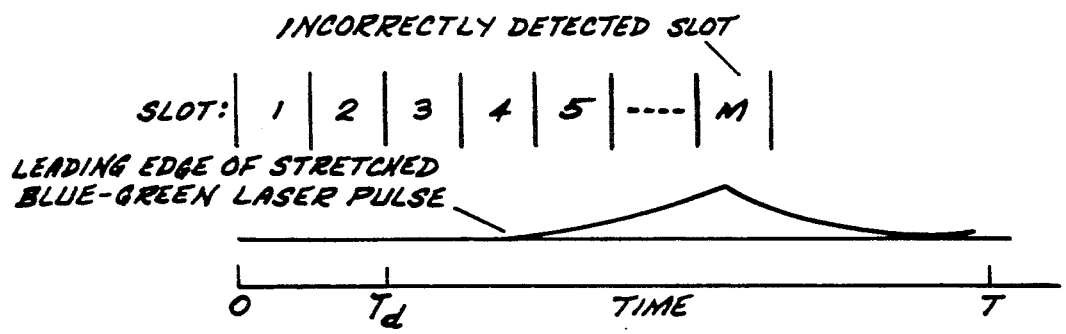

FIGS. 2A, 2B and 2C show the undesirable effect of pulse stretching when it occurs in conjunction with an external noise source; in this case, bioluminescence. In FIG. 2A, normal operation with a laser pulse and solar noise is shown. In the case of bioluminescent noise, incorrect slot (or "bin") detection can take place, as shown in FIG. 2B. With a temporally extended pulse, as shown in FIG. 2C, establishing the proper triggering levels becomes much more difficult, and random errors in bin location are much more easily introduced.

Figure 3A:
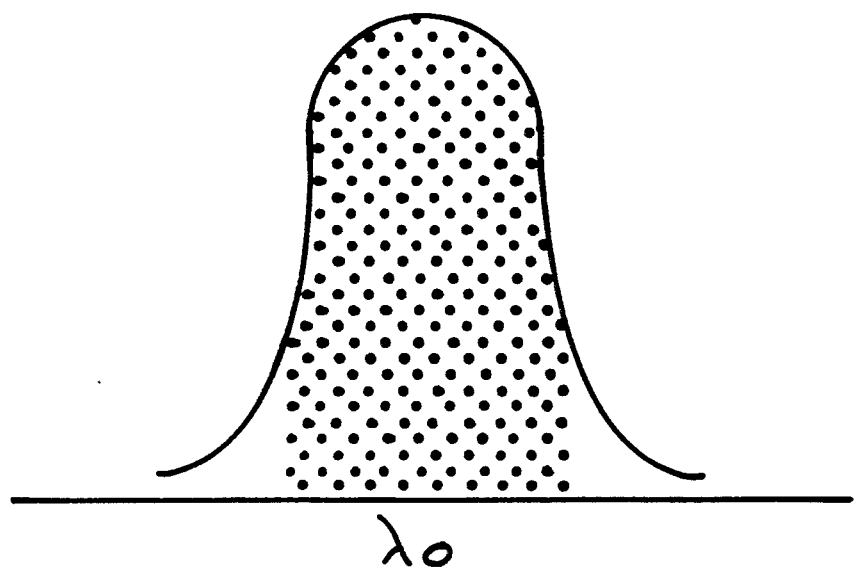
FIG. 3A is a graph depicting the doppler broadened spectrum of a metal vapor.

The normal gaussian doppler broadened frequency spectrum is shown in FIG. 3A. In FIG. 3A, on either side of the central part of the spectrum, with its exponential fall-off, radiation is rapidly absorbed and reemitted in a sequential step. This random walk process is responsible for trapping and pulse stretching in the prior art metal vapor cell of FIG. 1A.

Figure 3B:
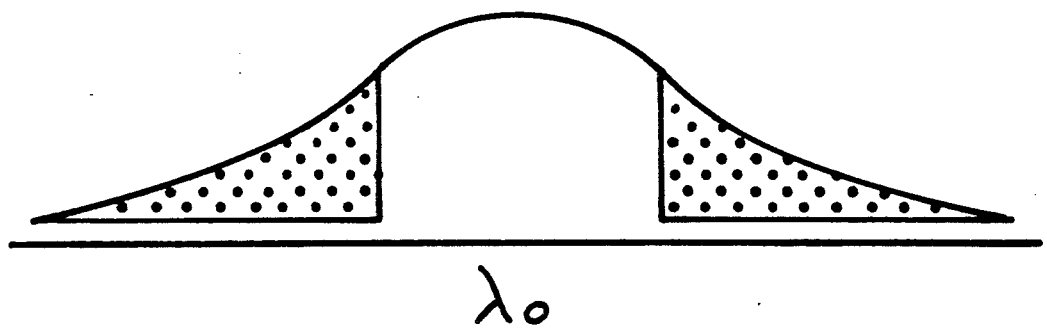
FIG. 3B is a graph depicting the effect of adding a buffer gas on the spectrum.

FIG. 3B shows the effects on introducing a helium inert buffer gas into the alkali metal vapor cavity of a QLORD filter in accordance with the present invention. In accordance with this invention, the alkali metal vapor is preferably cesium. The use of a helium inert buffer gas will eliminate the undesirable pulse stretching phenomenon of FIG. 3A. Introduction of a rare gas causes collision broadening of the frequency spectrum, as shown in FIG. 3B. Here, the profile is Lorenzian (as opposed to a Gaussian profile as in FIG. 3A). This has the effect of providing far more states in the wings of the spectrum.

Thus, helium buffer gas can be used to enhance the fluorescent decay of the excited atomic states to the ground level. In one application of the present invention, it is possible to limit pulse stretching within the detector of FIG. 1B to less than one microsecond thereby enabling a greater communications rate per given time than the stretched pulse would allow.

The present invention is the preferred embodiment for receiver-filters to be utilized in submarine laser applications. In order to communicate effectively with submarines, the transmitters and receivers must be tuned to wavelengths of between 420 to 480 nm. Submarines operate in deep water, several hundreds of feet below the surface of the ocean. The classes of water encountered in these operations are Jerlov Class I water, the clearest water, Class $1_a$ and Class $1_b$ water, as shown in the Jerlov chart of FIG. 4. The less clear waters (and these also include Class II and III) are found in coastal areas where submarines do not operate. In the open ocean, there are areas where water in the thermocline is Class $1_a$ and $1_b$ water. The thermocline only extends down for some 100 to 200 feet. All water below the thermocline is Class 1 water.

U.S. Pat. No. 4,829,597 to Gelbwachs relates to a Q-LORD filter of the type hereinabove discussed which operates at one or more of the magnesium Fraunhofer lines in the green portion of the solar spectrum (i.e., 517 nm). The Gelbwachs filter comprises an ultra high Q optical atomic resonance filter with a wide field of view that uses two pump lasers, a buffer gas and an alkaline earth atomic vapor (namely magensium) to convert underwater signals in the Fraunhofer wavelengths in the green portion of the spectrum, namely $\lambda = 516.733$ nm, $517.270$ nm and $518.362$ nm, to UV light, which is detectable by conventional photomultiplier tubes.

Figure 4:
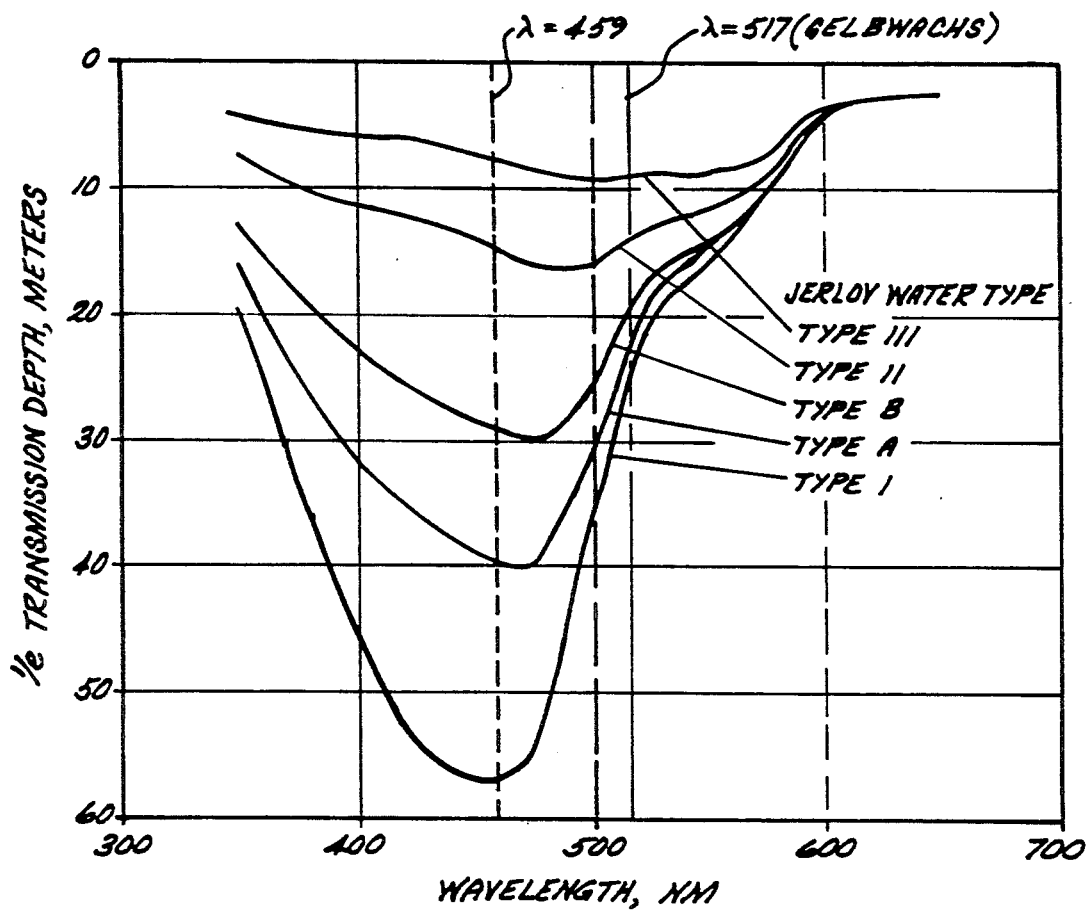
FIG. 4 is a graph depicting the optical transmission characteristics of the ocean in the visible wavelength as a function of wavelength, the graph of FIG. 4 being commonly known as a Jerlov chart.

In contrast to the present invention which operates at wavelengths of between 420 to 480 nm for submarine communications, Gelbwachs requires transmitting and receiving at 517 nm. This wavelength is well out of the range of usefulness for submarine communications. The properties of the medium through which the communications signals pass, as shown in FIG. 4, have thus been ignored in the Gelbwachs scheme. As an example, compare the performance of a laser detector system based on Gelbwachs with one based on the present invention. Assume that there are two laser systems, each providing one joule per pulse, and that the systems are illuminating a region 10,000 km$^2$ in area. The first system is a laser transmitting at 459 nm, as in the present invention; the second, a laser transmitting at 517 nm in accordance with Gelbwachs. It is assumed that the systems are operating at a time of maximum solar noise, high noon on the equator, and that the effective detector area is 50 cm$^2$. It is further assumed that the superior quantum efficiency of the detectors of Gelbwachs is offset by the inefficiency of the cumbersome and complicated multiple excitation process, and cavity losses associated with accommodating the laser optics required. This efficiency is set at 5% for both Gelbwachs and the present invention. However, as will be seen, the requirement of Gelbwachs to operate at a fixed wavelength far away from the Jerlov minimum is the dominant feature in the comparison of the more efficient present invention with less effective Gelbwachs. The purpose of this comparison is to show that the choice of 517 nm as an appropriate wavelength for submarine communications is seriously limiting if not disqualifying for this purpose since the submarine will now have to come to very shallow depths to receive signals; and that with such narrow band filter receivers as the atomic resonance filter, operating in a Fraunhofer line is not necessary, as the system will be photon limited, not signal to noise limited and thus the cumbersome and impractical system of double excitation of metal vapor by additional lasers (as taught by Gelbwachs) is not necessary. An additional problem with the lack of a sufficient number of photons at greater depth using the Gelbwachs approach is that the narrow band solar radiation free line becomes filled with light Raman scattered into the band from out of band solar radiation. Bioluminescence from the deep scattering layer and shallower provides another source of radiative noise which can be quite significant at various seasons and at various parts of the ocean. Of course, at night, or in dawn or evening hours, operating in a Fraunhofer line is completely unnecessary.

The results are shown in TABLE 1 where the data above the dashed line is considered useful for underwater communications: and the data below the line is considered not useful. It is clear that in the Class 1 water of the deep ocean where submarines operate, the configuration of Gelbwachs is severely photo limited and in addition, operating in Fraunhofer lines, even with a large reduction in solar noise does not produce a superior signal to noise ratio in either Class 1 or Class 1 at 100 meters; and in no waters greater than 200 meters. The configuration of Gelbwachs is practically useless in Class Ib and 11 water at 200 meters, and in all waters 300 meters and greater, under the assumed conditions. Conditions such as the illumination and laser intensity may be changed, but the comparison between Gelbwachs and the present invention will have the same quantitative relationship.

TABLE I

| Jerloy Water Class | $\lambda = 517$ nm, (Gelbwachs) | | $\lambda = 459$ nm (present invention) | |
|---|---|---|---|---|
| | Signal (Photon/cm$^2$) | SNR | Signal (Photons/cm$^2$) | SNR |
| Depth = 100 meters | | | | |
| I  | $4.0 \times 10^5$  | $2.9 \times 10^3$ | $3.7 \times 10^6$ | $1.4 \times 10^4$ |
| Ia | $2.8 \times 10^5$  | $2.4 \times 10^3$ | $1.9 \times 10^6$ | $1.7 \times 10^3$ |
| Ib | $1.02 \times 10^5$ | $1.4 \times 10^3$ | $8.2 \times 10^5$ | $6.2 \times 10^2$ |
| II | $2.05 \times 10^4$ | $6.6 \times 10^2$ | $6.4 \times 10^4$ | $1.7 \times 10$ |
| Depth = 200 meters | | | | |
| I  | $6.2 \times 10^3$ | 364 | $6.1 \times 10^5$ | $1.1 \times 10^3$ |
| Ia | $2.9 \times 10^3$ | 245 | $1.5 \times 10^5$ | 549 |
| Ib | 386 | 89  | $2.9 \times 10^4$ | 245 |
| II | 16  | 16  | $1.8 \times 10^3$ | 193 |
| Depth = 300 meters | | | | |
| I  | 96 | 45 | $9.8 \times 10^4$ | $2.5 \times 10^3$ |
| Ia | 30 | 25 | $1.3 \times 10^4$ | 140 |
| Ib | — | — | $1.0 \times 10^4$ | 39 |
| II | — | — | 5 | approx 1 |
| At the surface | | | | |
| | Signal = $2.59 \times 10^7$ | | Signal = $2.30 \times 10^7$ | |
| | SNR = $1.25 \times 10^6$ | | SNR = $1.25 \times 10^7$ | |

Gelbwachs also differs in several other important respects from the filter detector of the present invention. First, Gelbwachs teaches the use of alkaline earth metals specifically magnesium. Alkaline earth metals, are difficult to handle and to vaporize. In contrast, the present invention uses alkali metals, specifically cesium, which is easy to vaporize, is easy to maintain in the vapor state and is widely used for many applications.

A second important distinction is that Gelbwachs teaches a helium or argon buffer gas to deexcite a 4p$^3$P state to a 3d$^3$D in an alkaline earth metal vapor. In contrast, the present invention uses only helium, argon is unsatisfactory; and in the present embodiment, the helium gas added causes homogeneous and pressure broadening; and serves to eliminate the wings to the homogeneous doppler broadened fluorescence line, preventing radiation trapping by broadening the fluoroescence linewidth.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for detecting light at a first wavelength $\lambda_1$, said first wavelength being in the range of between about 420 to 480 nm, consisting essentially of the steps of:

providing an alkali metal vapor consisting essentially of cesium having atoms at a first energy level and capable of absorbing light at said first wavelength $\lambda_1$ and having absorbed said light at said first wavelength $\lambda_1$, fluorescing light at a second wavelength $\lambda_2$;

providing an inert buffer gas consisting essentially of helium, said inert buffer gas mixing with said alkali metal vapor;

providing a first optical filter chosen to transmit said first wavelength $\lambda_1$ and block said second wavelength $\lambda_2$;

providing a second optical filter spaced apart from said first optical filter and partially defining a cavity therewith for containment of said atomic vapor, said second optical filter being chosen to block said first wavelength $\lambda_1$ and transmit said second wavelength $\lambda_2$;

subjecting said mixture of inert buffer gas and atomic vapor, without any laser pumping, to irradiation by light at said first wavelength $\lambda_1$ thereby causing said atoms having said first energy level to be excited to a second higher energy level by absorption of light at a narrow band wavelength centered at $\lambda_1$, said excited atoms then fluorescing at a fluorescence wavelength $\lambda_2$ to a third energy level lower than said second energy level whereby light at said first wavelength $\lambda_1$ passing through said first optical filter is converted to light having said second wavelength $\lambda_2$ passing through said second optical filter; and said helium buffer gas substantially eliminating trapping of said second wavelength $\lambda_2$ in the infrared within said cavity.

2. A filter for detecting light at a first wavelength $\lambda_1$, said first wavelength being in the range of between 420 to 480 nm, consisting essentially of:

an alkali metal vapor consisting essentially of cesium having atoms at a first energy level, said atoms being capable of absorbing light at said first wavelength $\lambda_1$ and, having absorbed said light at said first wavelength $\lambda_1$ fluorescing light at a second wavelength $\lambda_2$;

an inert buffer gas consisting essentially of helium mixed with said alkali metal vapor;

a first optical filter chosen to transmit light at said first wavelength $\lambda_1$ and block light at said second wavelength $\lambda_2$; and a second optical filter spaced apart from said first optical filter and partially defining a cavity therewith for containment of said mixture of inert buffer gas and alkali metal vapor, said second optical filter being chosen to block said first wavelength $\lambda_1$ and transmit said second wavelength $\lambda_2$ whereby irradiation, without any laser pumping, of said atomic vapor by light having said first wavelength $\lambda_1$ and passing through said first optical filter causes aid atoms having said first energy level to be excited to a second higher energy level by absorption of light at a narrow band wavelength centered at $\lambda_1$, said excited atoms then fluorescing to a third energy level lower than said second energy level at a fluorescence wavelength $\lambda_2$ thereby resulting in light at said first wavelength $\lambda_1$ passing through said first optical filter being transformed to light having said second wavelength $\lambda_2$ and passing through said second optical filter; and said helium buffer gas substantially eliminating trapping of said second wavelength $\lambda_2$ in the infrared within said cavity.

3. An optical filter detector consisting essentially of:

a transparent cell having two spectral bandpass filters, one filter being located on each opposed side of the cell;

an alkali metal vapor consisting essentially of cesium in the cell wherein an incoming light pulse having a wavelength $\lambda_1$ is emitted from the cell as a pulse of light having a wavelength $\lambda_2$, said alkali metal vapor being free of any laser pumping, said first wavelength being in the range of between 420 to 480 nm; and inert buffer gas consisting essentially of helium being added to the cell and mixed with the alkali metal vapor to provide a sharper emitted pulse $\lambda_2$; and said helium buffer gas substantially eliminating trapping of said second wavelength $\lambda_2$ in the infrared within said cell.

* * * * *